United States Patent
Li

(10) Patent No.: US 8,038,840 B2
(45) Date of Patent: Oct. 18, 2011

(54) PROCESS FOR REFINING AND PRODUCING CELLULOSE, LIGNIN AND XYLOSE FROM BIOMASS MATERIAL

(76) Inventor: Rongxiu Li, Shanghai (CN)

( * ) Notice: Subject to any disclaimer, the term of this patent is extended or adjusted under 35 U.S.C. 154(b) by 0 days.

(21) Appl. No.: 12/530,421

(22) PCT Filed: Mar. 6, 2008

(86) PCT No.: PCT/CN2008/070432
§ 371 (c)(1),
(2), (4) Date: Sep. 8, 2009

(87) PCT Pub. No.: WO2008/106895
PCT Pub. Date: Sep. 12, 2008

(65) Prior Publication Data
US 2010/0200182 A1    Aug. 12, 2010

(30) Foreign Application Priority Data

Mar. 8, 2007 (CN) .......................... 2007 1 0037882

(51) Int. Cl.
*D21C 3/04* (2006.01)
*D21C 3/20* (2006.01)

(52) U.S. Cl. ................ 162/14; 162/16; 162/76; 162/77; 127/37

(58) Field of Classification Search ..................... 162/14, 162/16, 76, 77, 72; 127/34, 36, 37
See application file for complete search history.

(56) References Cited

U.S. PATENT DOCUMENTS

| | | | | |
|---|---|---|---|---|
| 2,022,654 A | * | 12/1935 | Dreyfus ........................... | 162/74 |
| 2,070,585 A | * | 2/1937 | Dreyfus ........................... | 162/72 |
| 2,668,761 A | * | 2/1954 | Bate et al. ........................ | 162/74 |
| 3,212,933 A | * | 10/1965 | Hess et al. ....................... | 127/37 |
| 4,470,851 A | * | 9/1984 | Paszner et al. ................... | 127/37 |
| 4,520,105 A | * | 5/1985 | Sinner et al. .................... | 435/163 |
| 4,742,814 A | * | 5/1988 | Sinner et al. ..................... | 127/37 |
| 4,904,342 A | | 2/1990 | Arnoldy et al. | |
| 5,730,837 A | * | 3/1998 | Black et al. ...................... | 162/16 |
| 2005/0061457 A1 | * | 3/2005 | Skuratowicz .................... | 162/14 |
| 2009/0020112 A1 | * | 1/2009 | Massonne et al. ............... | 127/37 |

FOREIGN PATENT DOCUMENTS

| | | |
|---|---|---|
| CA | 1100266 | 5/1981 |
| CN | 101016703 | 8/2007 |
| DE | 3423024 A1 | 1/1986 |
| GB | 701107 | 12/1953 |
| SU | 1043211 A1 | 9/1983 |

OTHER PUBLICATIONS

International Search Report for Application No. PCT/CN2008/070432, dated Jun. 19, 2008.

* cited by examiner

Primary Examiner — Eric Hug
Assistant Examiner — Peter Chin
(74) Attorney, Agent, or Firm — Lathrop & Gage LLP; Giulio A. DeConti, Jr.; Brian C. Trinque

(57) ABSTRACT

A process for refining and producing cellulose, lignin and xylose from biomass material comprises the following steps: pulverizing and screening the biomass material; and then dipping the biomass material in organic acid with lower boiling point and decomposing it into xylose, xylo-oligosaccharide, cellulose and lignin to make the biomass material fluidify; cooling the fluidified biomass material after finishing the reaction, adding organic solvent, and mixing uniformly and standing; separating, washing and drying the precipitation to obtain amorphous cellulose after precipitating; distilling the mother solution of precipitation of cellulose and recovering the organic acid and the resulting volatile organic substance; standing the distilled mother solution after cooling, and then separating, washing and drying the precipitation to obtain xylose and xylo-oligosaccharide after precipitating; distilling and recovering the organic solvent in the mother solution of precipitation of xylose and xylo-oligosaccharide, and separating and drying the precipitation separated out from the distilled mother solution.

18 Claims, No Drawings

PROCESS FOR REFINING AND PRODUCING CELLULOSE, LIGNIN AND XYLOSE FROM BIOMASS MATERIAL

TECHNICAL FIELD

The present invention relates to bioengineering field, especially to a process for refining and producing cellulose, lignin and xylose from biomass material.

BACKGROUND

Biomass refers to the photosynthesis of various biological material from carbon dioxide and water. It can store solar energy in chemical form, renewably store biosphere carbon, and is an important link of the carbon cycle on earth. Biomass mainly in the form of tree such as twig, agriculture waste such as wheat and rice straw, corn stover, as well as grass such as switch grass. These biomass mainly composed with cellulose, hemicelluloses and lignin entangling to form dense texture, resisting to separation and degradation. Thus the depolymerization and processing is one of the biggest bottle neck of biomass material utilization. The breakthrough of this barrier would improve the economy of biofuel ethanol, increase the supply of bio-originated bulk chemicals, and increase the competition of environment friendly polylactic acid over mineral oil based plastic.

Reference search showed that a Chinese patent (Chinese patent no. 02145150.8) revealed a process of hydrolysis of biomass with diluted acid under temperature of 100-200° C. for preparation of reduced fermentable mono-sugar. Since the dilute acid used is mineral acid as in other strong acid process, there exist the same disadvantage of different recovery and low recycle of mineral acid, waste discharge polluting environment.

DETAILED DESCRIPTION OF THE INVENTION

The invention aims to overcome the drawbacks of current technology, provide a process for refining and producing cellulose, lignin and xylose from biomass material, which would make the complete utilization of biomass material reduction of waste discharge and environmental friendly.

In the process of present invention, the biomass material was first soaked with organic acid with lower boiling point to make the hemicellulose therein partly hydrolyzed to reducing xylose and release cellulose and lignin, then the cellulose, lignin, xylose and xylo-oligosaccharide were fractionated with organic solvent, and the used organic acid and organic solvent were recovered.

Specially, the present invention comprises the following steps:

(1) pulverizing and screening the biomass material, dipping the biomass material in organic acid with lower boiling point and decomposing it into xylose, xylo-oligosaccharide, cellulose and lignin to make the biomass material fluidify, and cooling the fluidified biomass material after finishing the reaction; wherein the screening is with 8-64 mesh sieve, the organic acid with lower boiling point has the concentration of 20-100% (v/v), the weight/volume ratio (w/v) of the biomass material and the organic acid with lower boiling point is 1:2-20, and the dipping is at the temperature of 20-120° C. for 1-12 hours;

(2) adding 2-10 volumes of organic solvent into the cooled fluidified biomass material, mixing uniformly and standing for 2-12 hours, then separating, washing and drying the precipitation to obtain amorphous cellulose after precipitating, and the mother solution of precipitation of cellulose is reserved for use;

(3) distilling the mother solution of precipitation of cellulose and recovering the organic acid and the resulting volatile organic substance, standing the distilled mother solution for 2-12 hours after cooling to 18-35° C., and then separating, washing and drying the precipitation to obtain xylose and xylo-oligosaccharide after precipitating, and the mother solution of precipitation of xylose and xylo-oligosaccharide is reserved for use;

(4) distilling and recovering the organic solvent in the mother solution of precipitation of xylose and xylo-oligosaccharide, and separating and drying the precipitation separated out from the distilled mother solution to obtain lignin.

The biomass material refers to 1) woody plant like branches and twigs, 2) agricultural crops and their residues including rice straw and corn stover; 3) herbaceous material including switch grass and wild grasses.

The organic acid is selected from the group consisting of trifluoroacetic acid, trifluoromethane sulfonic acid, and combinations thereof.

The organic solvent has the boiling point higher than the organic acid, and is selected from the group consisting of ethanol, propanol, isopropanol, 2-methyl-1-butanol, 3-methyl-1-butanol, n-pentanol, iso-pentanol, hexanol, cyclo hexanol, dioxane, heptanol, octanol, and combinations thereof The invention process can totally recycle organic solvent and organic acid without waste discharge, is an environment friendly green technology, and can use biomass material completely to manufacture cellulose, lignin, xylose. These products could be used as the material for health care products, medicine, chemical and energy products. The cellulose is of loose amorphous property and easy to process; the lignin is of high purity (the content of cellulose and hemicellulose is lower than 2% (w/w), easy to convert into other chemical products. The invention is also suitable for other plant material containing hemicelluloses, cellulose and lignin.

EXAMPLES

The invention will now be described in further detail with reference to the following examples. The examples are provided for illustrative purposes, and are not to be construed as limiting the scope of the invention in any way. Throughout the examples, the following methods are used unless otherwise stated: NREL Laboratory Analytical Procedures, LAPs (http://www1.eere.energy.gov/biomass/analytical_procedures.html), including Determination of Sugars, Byproducts, and Degradation Products in Liquid Fraction Process Samples, Amie Sluiter, 2006, Biomass Analysis Technology Team (Version 2005), Laboratory Analytical Procedure, NREL; and Determination of Structural Carbohydrates and Lignin in Biomass, Amie Sluiter, 2006, Biomass Analysis Technology Team, Laboratory Analytical Procedure (Version 2005), NREL. Reducing sugar was assayed with 3,5-dinitroalicylic acid (DNS), which reacted an oxidation reduction reaction with the reducing end of reducing sugar under alkali and boiling condition to produce red brown 3-amino-5-nitroalicylic acid. In certain extent, the color is in proportion with the reducing sugar content, with reference to glucose, the reducing sugar mass fraction was corrected with factor 0.9.

Example 1

Produce Xylose, Xylo-Oligosaccharide, Cellulose and Lignin from Wheat Straw Wheat straw was pulverized to pass 64-mesh sieve, 1.0 g weighed and put into a round-bottom flask with 8 ml of trifluoroacetic acid (TFA). The flask was sealed and heated at 60° C. for 12 hours in a sand bath. The solution was cooled to 18° C. and 80 ml iso-pentanol was added, mixed well and standing for 12 hours. Separating, washing and drying the precipitation to obtain 0.46 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 18° C. and standing for 12 hours. The precipitate was separated, washed and dried to get 0.15 g xylose and xylo-oligosaccharide. The mother solution was distilled again to collect the fraction of 125-135° C. for iso-pentanol recovery, and the final solid precipitate was separated and dried to get 0.22 g lignin.

Example 2

Produce Xylose, Xylo-Oligosaccharide, Cellulose and Lignin from Wheat Straw

Wheat straw was pulverized to pass 8-mesh sieve, 1.0 g weighed and put into a round-bottom flask with 4 ml of trifluoroacetic acid (TFA). The flask was sealed and heated at 75° C. for 6 hours in a sand bath. The solution was cooled to 25° C. and 20 ml pentanol was added, mixed well and standing for 6 hours. Separating, washing and drying the precipitation to obtain 0.43 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 25° C. and standing for 6 hours. The precipitate was separated, washed and dried to get 0.20 g xylose and xylo-oligosaccharide. The mother solution was distilled again to collect the fraction of 132-142° C. for pentanol recovery, and the final solid precipitate was separated and dried to get 0.25 g lignin.

Example 3

Produce Xylose, Xylo-Oligosaccharide, Cellulose and Lignin from Corn Stover

Corn stover was pulverized to pass 8-mesh sieve, 1.0 g weighed and put into a round-bottom flask with 2 ml of trifluoroacetic acid (TFA). The flask was sealed and heated at 80° C. for 8 hours in a sand bath. The solution was cooled to 30° C. and 20 ml iso-pentanol was added, mixed well and standing for 2 hours. Separating, washing and drying the precipitation to obtain 0.48 g amorphous cellulose after precipitating. The mother solution was distilled and the fraction of 75-85° C. was collected to recover trifluoroacetic acid. The distillation mother solution was cooled to 35° C. and standing for 12 hours. The precipitate was separated, washed and dried to get 0.25 g xylose and xylo-oligosaccharide. The mother solution was distilled again and fraction of 78-88° C. was collected to recover iso-pentanol and the fraction of 115-125° C. was collected to recover acetic acid. The final solid precipitate was separated and dried to get 0.22 g lignin.

Example 4

Produce Xylose, Xylo-Oligosaccharide, Cellulose and Lignin from Rice Straw

Rice straw was pulverized to pass 16-mesh sieve, 1.0 g weighed and put into a round-bottom flask with 12 ml 20% trifluoromethane sulfonic acid. The flask was sealed and heated at 120° C. for 1 hours in a sand bath. The solution was cooled to 35° C. and 36 ml octanol was added, mixed well and standing for 6 hours. Separating, washing and drying the precipitation to obtain 0.38 g amorphous cellulose after precipitating. The mother solution was distilled and the fraction of 115-125° C. was collected to recover acetic acid, the fraction of 150-170° C. was collected to recover trifluoromethane sulfonic acid. The distillation mother solution was cooled to 35° C. and standing for 6 hours. The precipitate was separated, washed and dried to get 0.26 g xylose and xylo-oligosaccharide. The mother solution was distilled again to collect the fraction of 190-200° C. for octanol recovery, and the final solid precipitate was separated and dried to get 0.26 g lignin.

Example 5

Produce Xylose, Xylo-Oligosaccharide, Cellulose and Lignin from Poplar Tree Wood Poplar tree wood was pulverized to pass 16-mesh sieve, 1.0 g weighed and put into a round-bottom flask with 15 ml 60% trifluoromethane sulfonic acid. The flask was sealed and heated at 20° C. for 4 hours in a sand bath. The solution was cooled to 30° C. and 45 ml heptanol was added, mixed well and standing for 4 hours. Separating, washing and drying the precipitation to obtain 0.45 g amorphous cellulose after precipitating. The mother solution was distilled and the fraction of 115-125° C. was collected to recover acetic acid, the fraction of 150-175° C. was collected to recover trifluoromethane sulfonic acid. The distillation mother solution was cooled to 35° C. and standing for 6 hours. The precipitate was separated, washed and dried to get 0.17 g xylose and xylo-oligosaccharide. The mother solution was distilled again to collect the fraction of 170-180° C. for heptanol recovery, and the final solid precipitate was separated and dried to get 0.24 g lignin.

Example 6

Produce Xylose, Xylo-Oligosaccharide, Cellulose and Lignin from Acacia Tree Wood Acacia tree wood was pulverized to pass 64-mesh sieve, 1.0 g weighed and put into a round-bottom flask with 20 ml trifluoroacetic acid. The flask was sealed and heated at 70° C. for 8 hours in a sand bath. The solution was cooled to 18° C. and 60 ml dioxane was added, mixed well and standing for 12 hours. Separating, washing and drying the precipitation to obtain 0.53 g amorphous cellulose after precipitating. The mother solution was distilled and the fraction of 75-85° C. was collected to recover trifluoroacetic acid. The distillation mother solution was cooled to 18° C. and standing for 12 hours. The precipitate was separated, washed and dried to get 0.17 g xylose and xylo-oligosaccharide. The mother solution was distilled again, the fraction of 95-105° C. was collected to recover dioxane and the fraction of 115-125° C. was collected to recover acetic acid. The final solid precipitate was separated and dried to get 0.24 g lignin.

Example 7

Produce Xylose, Xylo-Oligosaccharide, Cellulose and Lignin From Eucalyptus_Tree Wood Eucalyptus tree wood was pulverized to pass 32-mesh sieve, 1.0 g weighed and put into a round-bottom flask with 7 ml trifluoroacetic acid. The flask was sealed and heated at 45° C. for 12 hours in a sand bath. The solution was cooled to 20° C. and 50 ml 2-methyl-1-butanol was added, mixed well and standing for 12 hours. Separating, washing and drying the precipitation to obtain 0.58 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 20° C. and standing for 10 hours. The precipitate was separated, washed and dried to get 0.13 g xylose and xylo-oligosaccharide. The mother solution was distilled again to collect the fraction of 125-135° C. for 2-methyl-1-butanol recovery, and the final solid precipitate was separated and dried to get 0.25 g lignin.

Example 8

Produce Xylose, Xylo-Oligosaccharide, Cellulose and Lignin from Switchgrass

Switchgrass was pulverized to pass 16-mesh sieve, 1.0 g weighed and put into a round-bottom flask with 2 ml trifluoroacetic acid. The flask was sealed and heated at 85° C. for 12 hours in a sand bath. The solution was cooled to 25° C. and 20 ml propanol was added, mixed well and standing for 4 hours. Separating, washing and drying the precipitation to obtain 0.38 g amorphous cellulose after precipitating. The mother solution was distilled and the fraction of 75-85° C. was collected to recover trifluoroacetic acid. The distillation mother solution was cooled to 25° C. and standing for 10 hours. The precipitate was separated, washed and dried to get 0.26 g xylose and xylo-oligosaccharide. The mother solution was distilled again, the fraction of 95-105° C. was collected to recover propanol and the fraction of 115-125° C. was collected to recover acetic acid. The final solid precipitate was separated and dried to get 0.18 g lignin.

Example 9

Produce Xylose, Xylo-Oligosaccharide, Cellulose and Lignin from Bagasse

Bagasse was pulverized to pass 8-mesh sieve, 1.0 g weighed and put into a round-bottom flask with 7 ml trifluoroacetic acid. The flask was sealed and heated at 75° C. for 10 hours in a sand bath. The solution was cooled to 30° C. and 35 ml ethanol was added, mixed well and standing for 2 hours. Separating, washing and drying the precipitation to obtain 0.42 g amorphous cellulose after precipitating. The mother solution was distilled and the fraction of 75-85° C. was collected to recover trifluoroacetic acid. The distillation mother solution was cooled to 18° C. and standing for 10 hours. The precipitate was separated, washed and dried to get 0.22 g xylose and xylo-oligosaccharide. The mother solution was distilled again, the fraction of 75-85° C. was collected to recover ethanol and the fraction of 115-125° C. was collected to recover acetic acid. The final solid precipitate was separated and dried to get 0.20 g lignin.

Example 10

Produce Xylose, Xylo-Oligosaccharide, Cellulose and Lignin from Sorghum Stover

Sorghum stover was pulverized to pass 8-mesh sieve, 1.0 g weighed and put into a round-bottom flask with 5 ml trifluoroacetic acid. The flask was sealed and heated at 75° C. for 10 hours in a sand bath. The solution was cooled to 30° C. and 35 ml 3-methyl-1-butanol was added, mixed well and standing for 2 hours. Separating, washing and drying the precipitation to obtain 0.48 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 18° C. and standing for 10 hours. The precipitate was separated, washed and dried to get 0.24 g xylose and xylo-oligosaccharide. The mother solution was distilled again to collect the fraction of 125-135° C. for 3-methyl-1-butanol recovery, and the final solid precipitate was separated and dried to get 0.22 g lignin.

Example 11

Produce Xylose, Xylo-Oligosaccharide, Cellulose and Lignin from Bamboo

Bamboo was pulverized to pass 16-mesh sieve, 1.0 g weighed and put into a round-bottom flask with 8 ml trifluoroacetic acid. The flask was sealed and heated at 80° C. for 12 hours in a sand bath. The solution was cooled to 30° C. and 24 ml hexanol was added, mixed well and standing for 2 hours. Separating, washing and drying the precipitation to obtain 0.46 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 18° C. and standing for 10 hours. The precipitate was separated, washed and dried to get 0.25 g xylose and xylo-oligosaccharide. The mother solution was distilled again to collect the fraction of 153-163° C. for hexanol recovery, and the final solid precipitate was separated and dried to get 0.23 g lignin.

Example 12

Produce Xylose, Xylo-Oligosaccharide, Cellulose and Lignin from Miscanthus

Miscanthus was pulverized to pass 64-mesh sieve, 1.0 g weighed and put into a round-bottom flask with 6 ml trifluoroacetic acid. The flask was sealed and heated at 60° C. for 10 hours in a sand bath. The solution was cooled to 25° C. and 30 ml cyclo hexanol was added, mixed well and standing for 6 hours. Separating, washing and drying the precipitation to obtain 0.38 g amorphous cellulose after precipitating. The mother solution was distilled and the fraction of 75-85° C. was collected to recover trifluoroacetic acid, the fraction of 115-125° C. was collected to recover acetic acid. The distillation mother solution was cooled to 18° C. and standing for 10 hours. The precipitate was separated, washed and dried to get 0.23 g xylose and xylo-oligosaccharide. The mother solution was distilled again to collect the fraction of 156-165° C. for cyclo hexanol recovery, and the final solid precipitate was separated and dried to get 0.16 g lignin.

All documents mentioned in this specification are herein incorporated by reference to the same extent as if each individual document was specifically and individually indicated to be incorporated by reference. Further, it is understood that, after reading this specification, those skilled in the art can make variations and modifications to the present and the scope of protection of the invention is determined in particular by the following claims.

What is claimed is:

1. A process for producing cellulose, lignin and xylose from biomass material, the process comprising:
   (1) pulverizing and screening the biomass material, soaking the biomass material in organic acid followed by heating, resulting in a fluidified biomass material, and cooling the fluidified biomass material;
   (2) adding organic solvent, wherein the solvent has a boiling point that is higher than the boiling point of the organic acid, into the cooled fluidified biomass material, resulting in a mother solution and a precipitate comprising cellulose, then separating the precipitate from the mother solution, followed by washing and drying the precipitate to obtain amorphous cellulose;
   (3) distilling the mother solution and recovering the organic acid, cooling the distilled mother solution resulting in a second mother solution and a precipitate comprising xylose and xylo-oligosaccharide, and then separating the precipitate from the second mother solution, and washing and drying the precipitate to obtain xylose and xylo-oligosaccharide;
   (4) distilling the second mother solution and recovering the organic solvent, and separating the resulting precipitate from the distilled mother solution and drying the precipitate to obtain lignin.

2. The process of claim 1, wherein the biomass material is selected from the group consisting of woody plants, gramineous plants, herbage plants, and any combinations thereof.

3. The process of claim 1, wherein the screening in step (1) is screening with 8-64 mesh sieve.

4. The process of claim 1, wherein the organic acid with lower boiling point is selected from the group consisting of trifluoroacetic acid, trifluoromethane sulfonic acid, and combinations thereof.

5. The process of claim 4, wherein the organic acid with lower boiling point has the volume concentration of 20-100%.

6. The process of claim 1, wherein the weight/volume ratio of the biomass material and the organic acid with lower boiling point is 1:2-20.

7. The process of claim 1, wherein the organic solvent in step (2) is selected from the group consisting of ethanol, propanol, isopropanol, 2-methyl-1-butanol, 3-methyl-1-butanol, n-pentanol, iso-pentanol, hexanol, cyclo hexanol, dioxane, heptanol, octanol, and any combinations thereof.

8. The process of claim 7, wherein the organic solvent in step (2) is used with 2-10 times the volume of the fluidified biomass material.

9. The process of claim 1, wherein the cooling in step (1) and (3) is cooling at the temperature of 18-35° C.

10. The process of claim 1, wherein the biomass material is selected from the group consisting of wheat straw, corn stover, rice straw, poplar tree wood, acacia tree wood, eucalyptus tree wood, switchgrass, bagasse, sorghum, bamboo, and miscanthus.

11. A process for producing cellulose, lignin and xylose from biomass material, the process comprising:
   (1) pulverizing and screening the biomass material, soaking the biomass material in trifluoroacetic acid or trifluoromethane sulfonic acid, followed by heating, resulting in a fluidified biomass material, and cooling the fluidified biomass material;
   (2) adding organic solvent into the cooled fluidified biomass material, resulting in a mother solution and a precipitate comprising cellulose, then separating the precipitate from the mother solution, followed by washing and drying the precipitate to obtain amorphous cellulose;
   (3) distilling the mother solution and recovering the trifluoroacetic acid or trifluoromethane sulfonic acid, cooling the distilled mother solution resulting in a second mother solution and a precipitate comprising xylose and xylo-oligosaccharide, and then separating the precipitate from the second mother solution, and washing and drying the precipitate to obtain xylose and xylo-oligosaccharide;
   (4) distilling the second mother solution and recovering the organic solvent, and separating the resulting precipitate from the distilled mother solution and drying the precipitate to obtain lignin.

12. The process of claim 11, wherein the biomass material is selected from the group consisting of woody plants, gramineous plants, herbage plants, and any combinations thereof.

13. The process of claim 11, wherein the biomass material is selected from the group consisting of wheat straw, corn stover, rice straw, poplar tree wood, acacia tree wood, eucalyptus tree wood, switchgrass, bagasse, sorghum, bamboo, and miscanthus.

14. The process of claim 11, wherein the organic solvent in step (2) is selected from the group consisting of ethanol, propanol, isopropanol, 2-methyl-1-butanol, 3-methyl-1-butanol, n-pentanol, iso-pentanol, hexanol, cyclo hexanol, dioxane, heptanol, octanol, and any combinations thereof.

15. A process for producing cellulose, lignin and xylose from biomass material, the process comprising:
   (1) pulverizing and screening the biomass material, soaking the biomass material in trifluoroacetic acid or trifluoromethane sulfonic acid, followed by heating at a temperature of 60° C.-120° C., resulting in a fluidified biomass material, and cooling the fluidified biomass material;
   (2) adding organic solvent into the cooled fluidified biomass material, resulting in a mother solution and a precipitate comprising cellulose, then separating the precipitate from the mother solution, followed by washing and drying the precipitate to obtain amorphous cellulose;
   (3) distilling the mother solution and recovering the trifluoroacetic acid or trifluoromethane sulfonic acid, cooling the distilled mother solution resulting in a second mother solution and a precipitate comprising xylose and xylo-oligosaccharide, and then separating the precipitate from the second mother solution, and washing and drying the precipitate to obtain xylose and xylo-oligosaccharide;
   (4) distilling the second mother solution and recovering the organic solvent, and separating the resulting precipitate from the distilled mother solution and drying the precipitate to obtain lignin.

16. The process of claim 15, wherein the biomass material is selected from the group consisting of woody plants, gramineous plants, herbage plants, and any combinations thereof.

17. The process of claim 15, wherein the biomass material is selected from the group consisting of wheat straw, corn stover, rice straw, poplar tree wood, acacia tree wood, eucalyptus tree wood, switchgrass, bagasse, sorghum, bamboo, and miscanthus.

18. The process of claim 15, wherein, the organic solvent in step (2) is selected from the group consisting of ethanol, propanol, isopropanol, 2-methyl-1-butanol, 3-methyl-1-butanol, n-pentanol, iso-pentanol, hexanol, cyclo hexanol, dioxane, heptanol, octanol, and any combinations thereof.

* * * * *